Figure 6:
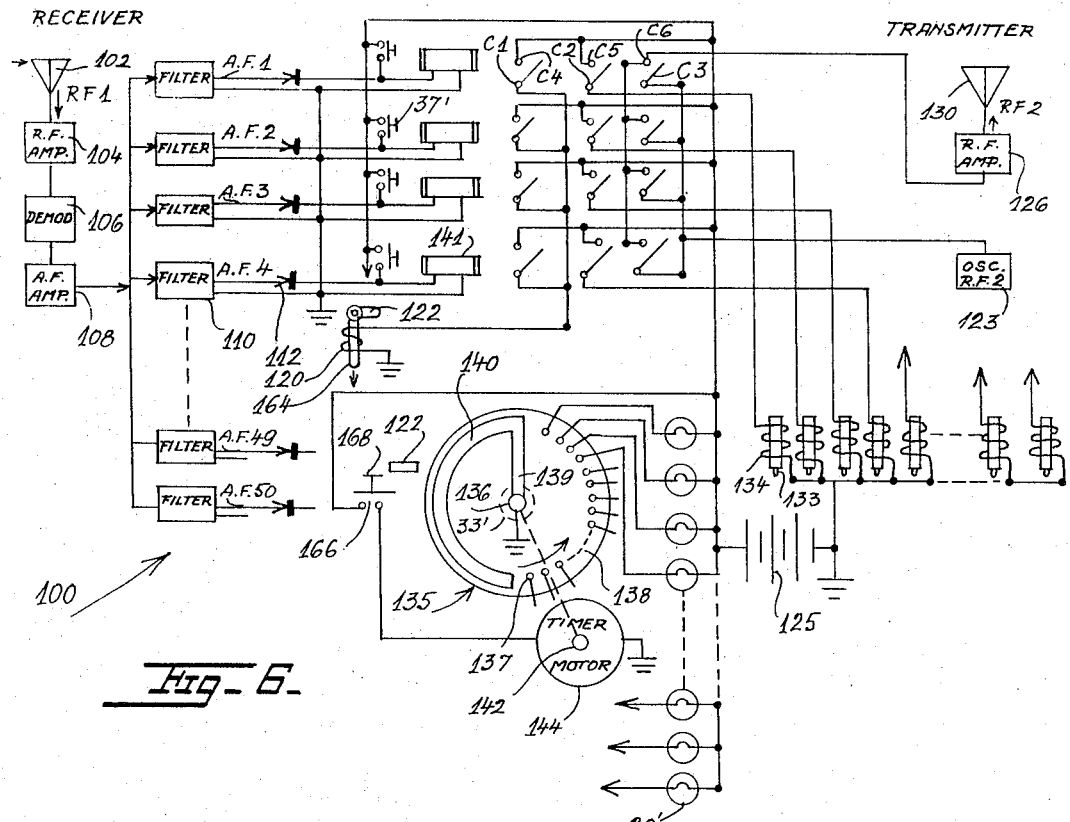

Jan. 24, 1967  T. WAGNER  3,300,771
AVIATION CONTROL LIGHT SYSTEM
Filed Nov. 27, 1964  4 Sheets-Sheet 1
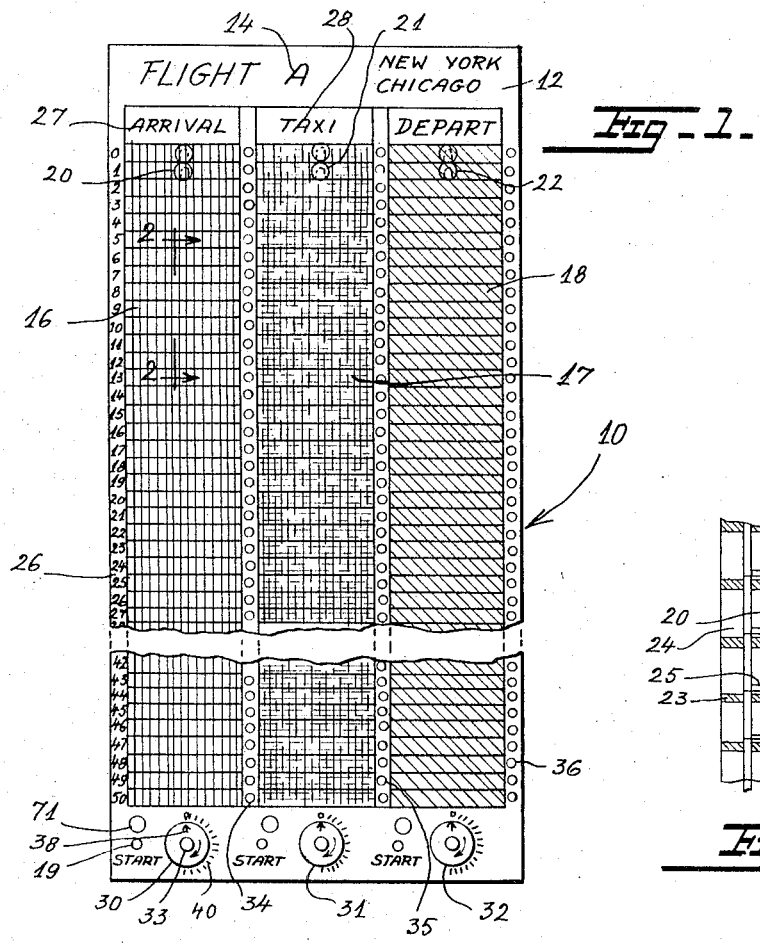
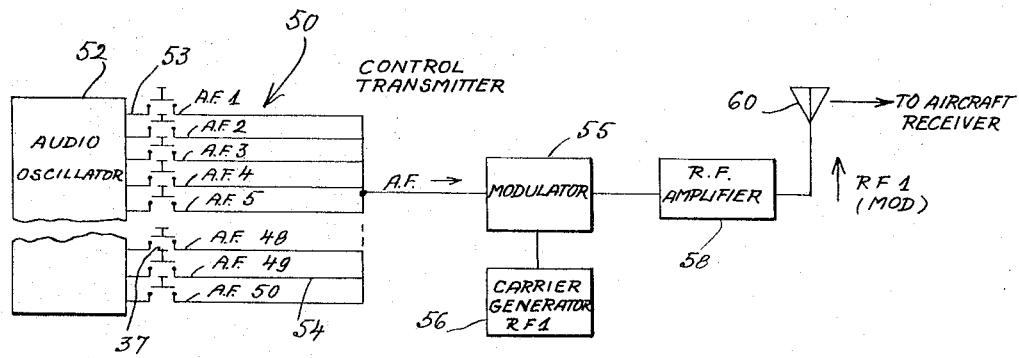
INVENTOR.
Tobias Wagner
BY
Polachek & Saulsbury
ATTORNEYS.

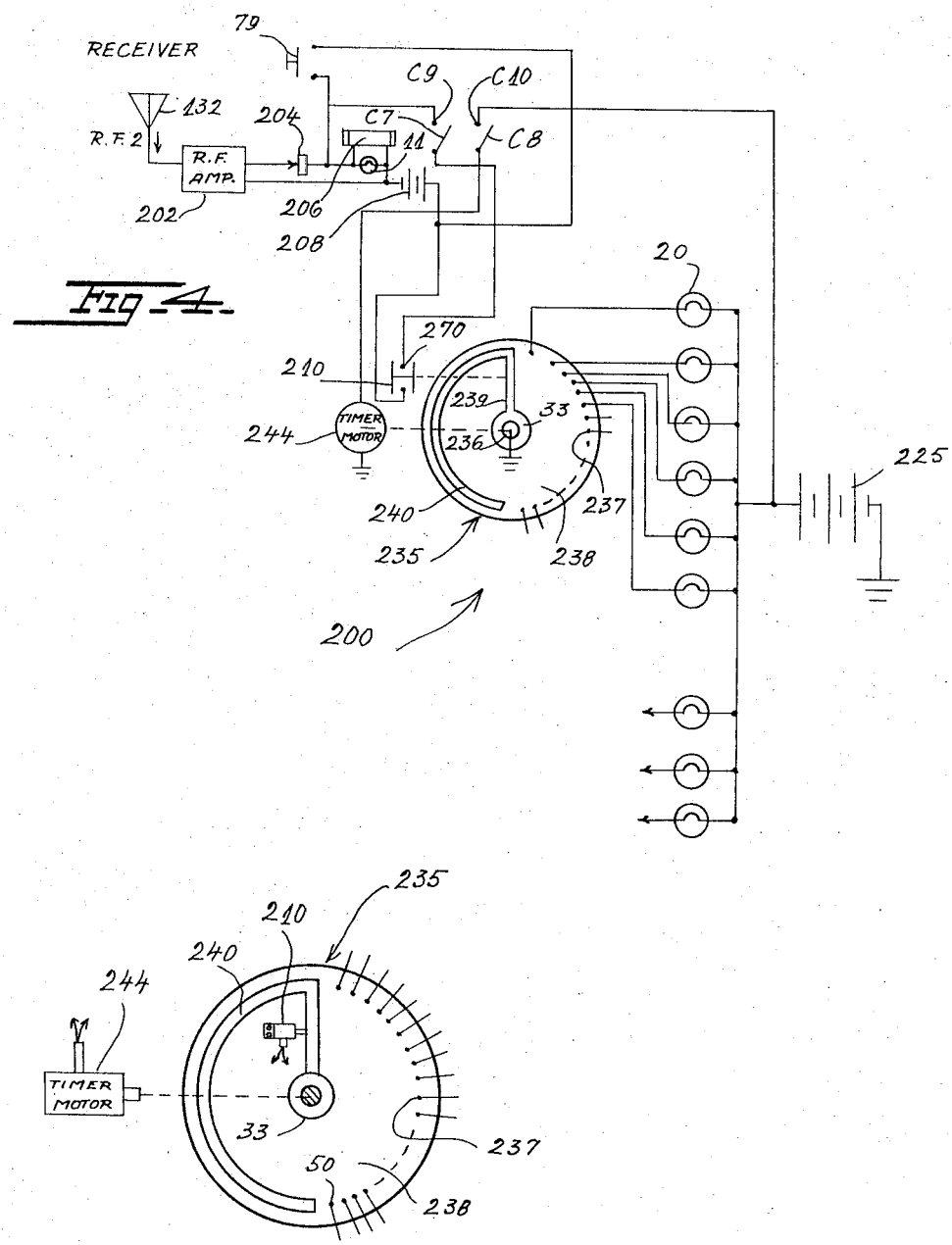

INVENTOR.
Tobias Wagner
BY
Polachek & Saulsbury
ATTORNEYS.

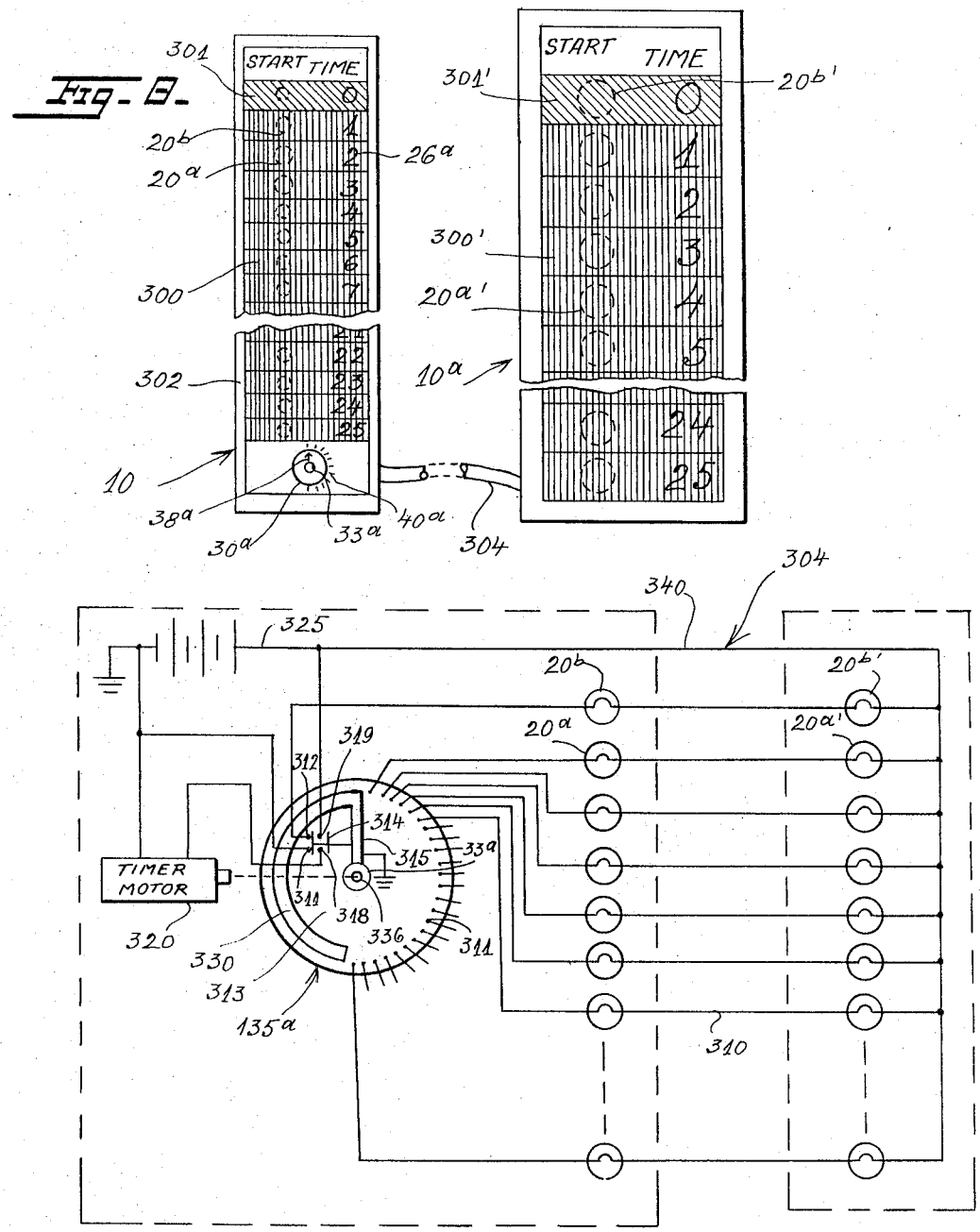

United States Patent Office 3,300,771
Patented Jan. 24, 1967

3,300,771
AVIATION CONTROL LIGHT SYSTEM
Tobias Wagner, Bronx, N.Y., assignor of
fifty percent to Mary T. Hanner
Filed Nov. 27, 1964, Ser. No. 414,353
10 Claims. (Cl. 340—309.1)

This invention relates to the art of timing apparatus and more particularly concerns equipment providing visual indication of time remaining in a set time interval.

According to the invention there is provided timing apparatus which, as one of its important uses, may be installed at a control tower or control center of an airport or aircraft carrier, and in aircraft departing from and arriving at the airport or aircraft carrier. The operator at the control tower can set a controlling device for a particular time interval representing waiting time for a particular aircraft to taxi or land at the airport or to depart from the airport. A controlled timing device installed in the particular aircraft will automatically be set for the same waiting time. The controlling and controlled timing devices will have display panels on which a number of lamps light, the lamps corresponding in number to the set waiting time. Each of the lamps at each device will go out in turn at the same time. When the last lamps at both devices go out, the waiting time will have expired, and the pilot of the aircraft can then proceed to do the operation waiting to be performed. At any time the timed interval can be interrupted at the controlling device and a new time interval can be set which will be followed at the controlled device.

The apparatus includes means whereby the controlling device and the controlled device can each be independently operated. Thus the operator at the control tower can set the controlling device manually and instruct the pilot of the aircraft over the usual control tower-to-aircraft radio link to set manually the timing device in the aircraft.

The apparatus in modified form can be used at a missile launching center to time count down prior to missile launch. It can be used at a race track, sports arena, television or radio broadcast station, railroad or other installation to set and monitor waiting time before start or occurrence of a planned event such as start of a race, game, start or end of a broadcast, departure of a train or bus, start or end of a working time interval, etc. The apparatus may be adapted to time any number of seconds, minutes, hours or longer periods.

It is therefore one object of the invention to provide timing apparatus including a controlling or master timing apparatus including a controlling or master timing device at which a time interval is set and a controlled or slave timing device at which a corresponding time interval is set.

A further object is to provide timing apparatus as described wherein both the controlling device and the controlled device include display panels in which a different number of lamps light for each set time interval, and in which the lamps go out in succession during the time interval.

Another object is to provide apparatus as described, wherein after the last lamps go out at both controlling and controlled devices at the end of a set time interval another lamp goes on at each device to indicate the expiration of the set time interval.

A further object is to provide timing apparatus as described, wherein setting of a time interval is independently performed at each of the controlled and controlling devices.

Another object is to provide timing apparatus including a controlling device at which a time interval is set, and a controlled device communicating with the controlling device by a two-way radio link so that the same time interval may be set at the controlled device, with means at the controlled device for automatically informing the controlling device that the time interval has been set and timing has started at the controlled device.

A further object is to provide timing apparatus as last described, wherein the controlled device returns a signal to the controlling device to activate a timer at the controlling device so that both devices time the set time interval in synchronism.

For further comprehension of the invention, and of the objects and advantages thereof, reference will be had to the following description and accompanying drawings and to the appended claims in which the various novel features of the invention are more particularly set forth.

Figure 7:
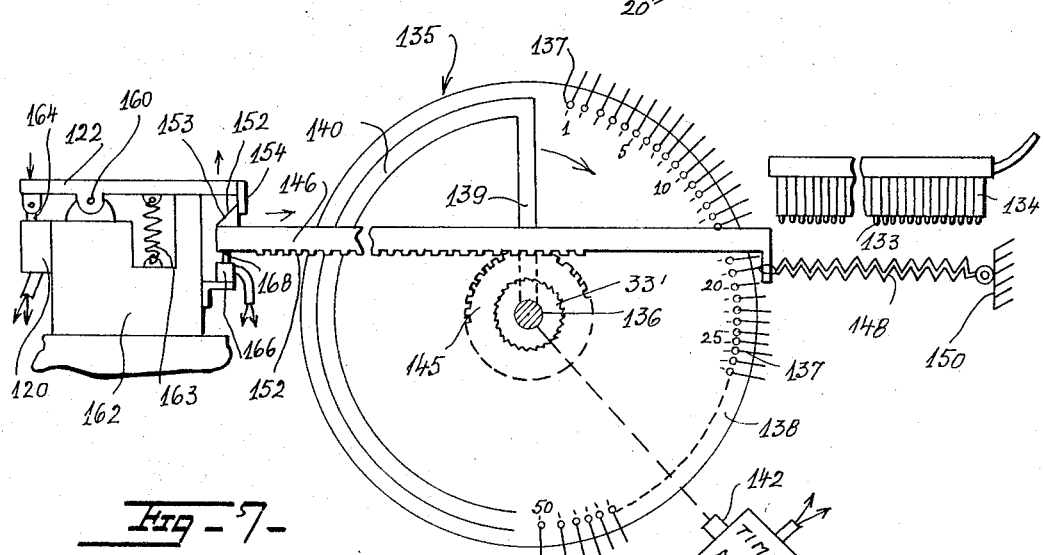

In the accompanying drawings forming a material part of this disclosure:

FIGURE 1 is a front view of a light display panel and controls of a timing device according to the invention, FIG. 2 is an enlarged fragmentary sectional view taken on line 2—2 of FIG. 1, FIG. 3 is a diagram of a signal transmission system employed by a timing controller or controlling timer device, FIG. 4 is a diagram of a receiving system in a timing device operable in association with the system of FIG. 3, FIG. 5 is an enlarged side view of part of the timing device of FIG. 4 with associated components shown diagrammatically, FIG. 6 is a diagram of a signal receiving and transmitting system and associated timing apparatus of a timing device controlled by the system of FIG. 3, FIG. 7 is an enlarged side view of part of the timing device of FIG. 6 with associated components shown diagrammatically, FIG. 8 is a front view of other controlling and controlled timing devices, and FIG. 9 is a diagram showing schematically the timing system employed in the devices of FIG. 8.

Referring first to FIGS. 1 and 2, there is shown a panel assembly 10 of a timing device. This panel assembly may be either that of a master or controlling timing device or that of a slave or controlled timing device, since panels in both devices look alike from the exterior. The panel assembly is arranged for use in an aircraft control system. It has a panel board or frame 12 on which is designated the number of symbol 14 of a particular flight and appropriate flight information 15. The panel board has three differently colored vertical windows 16, 17, 18 held in frame 12 in front of lamps 20, 21, 22. The lamps are located in individual compartments C defined between horizontal partitions 23 and vertical walls 24 of the frame. The lamps are connected by wires 25 in an electrical circuit to be described. At one side of the frame is a column of numbers 26 indicating time periods. These may represent a consecutive series of seconds, minutes, or longer times. At the top of each window is a heading 27, 28 or 29 indicating different operations to be performed by the aircraft designated by the flight symbol 14. Window 16 may be colored red, window 17 may be colored amber, and window 18 may be colored green. Thus the lamps emit differently colored light for the different flight operations: ARRIVAL, TAXI and DEPART. Other colors may be used and other flight operations may be provided for. Instead of using colored windows, the lamps may be colored and the windows can be translucent white or transparent. Below each window is a dial 30, 31 or 32 having a knob 33 so that the dial can be manually turned to set a particular time interval for each flight operation. Near each dial is a signal lamp 11 and a start push button switch 19. The back of the panel may be left open to provide access to the lamps and wiring 25. To the right of each window is a column of push buttons 34, 35 and 36 which operate switches 37, one push button being located adjacent to each lamp containing compartment and aligned with one of the numbers 26. Wiring 39 is connected to the push button switches. To operate the panel assembly, an operator turns one of dials 30, 31 or 32 to locate arrow 38 at a particular time interval on one of indexed scales 40 marked on the panel. This sets the time interval during which the corresponding flight operation is to be performed, then pushes one push button corresponding to the set time interval under the same flight operation. The remainder of the operating cycle of the apparatus then proceeds automatically as will now be explained with reference to FIGS. 3–7.

FIG. 3 shows a signal transmission system 50 which may be located at a control tower or control center for issuing timing control signals to a controlled station or plurality of stations. This system includes an oscillator 52 which produces a predetermined number of different frequencies. These frequencies may be audio frequencies ranging up to twenty kilocycles or may be in the supersonic range. In any case, the signal frequencies A.F. 1–A.F. 50 produced respectively at terminals 53 and are passed respectively to lines 54 via one of push button switches 37.

Each one of these switches is operated by one of the push buttons 34, 35 or 36. Operation of a switch selects a particular audio signal frequency to be applied to modulator 55 to which radio frequency generator 56 is connected. This generator produces a carrier frequency R.F. 1 which is modulated by the selected audio frequency, and the modulated carrier is applied to a radio frequency amplifier 58 from which it is passed to antenna 60 for transmission to a controlled station.

FIG. 6 shows diagrammatically apparatus 100 employed at the controlled station. Receiving antenna 102 is connected to radio frequency amplifier 104 which amplifies the modulated radio frequency signals received from system 50. The amplified radio frequency signals are passed to demodulator 106 where the original audio frequency signals are recovered and passed through audio amplifier 108 to narrow band filters 110. Only one of the filters passes the transmitted audio frequency A.F. 1–A.F. 50. Connected to each filter is a rectifier 112. The rectifier is connected to the coil of a relay 114. There are as many relays, rectifiers and filters as there are transmitted audio frequencies.

Each relay 114 has three movable contacts C1, C2, C3 and three fixed contacts C4, C5 and C6. Contacts C1 of all relays are connected to a solenoid 120 which operates a latch bar 122. Contacts C3 of all relays are connected to an oscillator or signal generator 123 which generates a second radio frequency R.F. 2. Contacts C4 and C5 of all relays are connected to one terminal of a power supply 125. Contacts C6 of all relays are connected to the input of a radio frequency amplifier 126. The output of the amplifier is connected to transmitter antenna 130 for sending radio frequency R.F. 2 to a receiving antenna 132 at the receiving portion 200 of the control system shown in FIG. 4.

Contacts C2 of all relays 114 are individually connected to different solenoids 134 disposed adjacent to each other near a timing switch 135. Each solenoid 134 has a plunger 133 which is extended downwardly when the solenoid is energized. The plunger retracts when the solenoid is deenergized.

The timing switch 135 has a plurality of fixed contacts 137 arranged circumferentially. Two or more contacts may be provided up to about one half of the circumference of stationary plate 138 on which the contacts are mounted. Each contact is connected to a different one of lamps 20'.

At this point it should be mentioned that the system illustrated in FIGS. 3–7 is devoted to timing a single flight operation. For purposes of illustration this may be the arrival of an aircraft. The apparatus components which are used to set and monitor waiting time for a taxi operation and a departure operation are duplicates of or identical to those described in connection with the arrival time operation, so description of apparatus involved in the one flight operation will suffice for all flight operations. Furthermore it will be assume that the panel assembly 10 of FIGS. 1 and 2 is being used at the control tower or control center. A substantially similar panel assembly is used installed in the aircraft. Components of the panels assembly including parts of the controlled apparatus 100 corresponding to those of panel assembly 10 and controlling apparatus 200 are identified by identical primed numbers.

The timing switch 135 has a shaft 136 which can be manually turned by means of knob 33' which is available at the front of the panel assembly at the controlled station. Shaft 136 is grounded. The shaft carries a radial arm 139 to which is secured an arcuate electrical contact 140. This contact may be rotated to contact one or more of fixed contacts 137 to connect them to ground and to the grounded terminal of power supply 125. Shaft 136 is operatively connected to shaft 142 of a timer motor 144. This motor drives shaft 136 at a constant speed, depending on the length of the timing cycle for the flight operation. The shaft 136 and contact 140 are arranged to rotate no more than one half revolution and then they are returned to starting position by means shown best in FIG. 7.

On shaft 136 is a gear 145 engaged by a horizontal rack gear 146. One end of gear 146, the right end is engaged by a spring 148 attached to a stationary support 150. The teeth 152 of the gear 146 are located on its bottom edge and ride over the gear 145 meshing with its teeth. The left end of the rack gear has an upstanding tooth 152 slanted at its outer edge 153 to permit the tooth to pass latch finger 154. The finger 154 is located at the right free end of latch bar 122. Bar 122 pivots on a pin 160 carried by stationary support 162. Spring 163 attached between the bar 122 and support 162 biases the right end of the bar 122 downwardly to engage finger 154 with tooth 152. The left end of the bar is attached to plunger 164 of solenoid 120 carried by support 162. A microswitch 166 having an operating arm or button 168 is mounted on the right side of the support 162. This button 168 is mounted on the right side of the support 162. This button 168 is depressed when the rack gear is located in the position shown in FIG. 7, with spring 148 extended and under tension. Switch 166 is connected between timer motor 144 and power supply 125. Switch 166 is connected between timer motor 144 and power supply 125. Push button switches 37' are connected between one terminal of power supply 125 and the respective coils of relays 114.

The controlled system 100 is arranged to operate either automatically or under manual control. For automatic operation the components will be in the position shown in FIGS. 6 and 7. A modulated signal R.F. 1 is received at antenna 102, amplified in tuned R.F. amplifier 104 and passed to demodulator 106 where the audio signal sent by the station 50 is recovered and passed through one of filters 110 and associated rectifier to associated relay 114. The relay will become energized and its contacts C1, C4, C2, C5; and C3, C6 will close.

When contacts C3, C6 close, high voltage is applied from power supply 125 to all switch contacts 137. When contacts C1, C4 close solenoid 120 is energized and plunger 164 is retracted to tilt the latch bar 122, and rack gear 146 is released. The rack gear moves to the right as spring 148 contracts, turning gear 145, arm 139 and contact 140 clockwise from the position shown in FIGS. 6 and 7. When contacts C2, C5 close, the associated one of solenoids 134 will be energized to project one plunger 133 into the path of the rack gear so that the rack gear will be stopped at its right end by the projecting plunger 133. This results in turning of the contact 140 a certain selected angular distance whereupon it will stop and all those lamps 20' will light whose contacts 137 are covered or contacted by contact 140. The covered contacts 137 will extend clockwise from the No. 1 contact 137'. As the rack gear 146 moves to the right, switch 166 which has been held open by this gear closes and the timer motor 144 is started to rotate shaft 136 counterclockwise. The arm 139 and contact 140 turn with shaft 136. At the same time gear 145 is turned and rack gear 146 is moved against tension in spring 148, to the left. The lighted lamps 20' will go out in turn at a constant rate until all the lamps 20' are extinguished at the end of the timed period.

At the end of the timed period the rack gear is again engaged and held by finger 154 and switch 166 is opened to stop the motor 144. Contact 140 will then be in the initial position shown in FIGS. 6 and 7. It will be noted that a pulse lasting no more than two or three seconds applied to a relay 114 is sufficient to start the automatic cycling.

When contacts C2, C5 close a radio frequency signal R.F. 2 is passed from oscillator 123 through amplifier 126 to antenna 130. The radiated signal is picked up by antenna 132 at the control station, and is there used to start the timing cycle at the control station in synchronism with the start of the cycle at the controlled station.

Apparatus 200 shown in FIGS. 3 and 4, includes a tuned radio frequency amplifier 202 connected to antenna 132. Connected to the output of amplifier 202 is a rectifier 204 and a coil of relay 206. A battery or power supply 208 is connected to the relay coil. This power supply is open circuited at push button switch 210 which is mounted on insulated plate 238 of timer switch 235. Switch 210 is a normally closed switch which is held open by the radial arm 239 of the switch, arm 239 carries arcuate contact 240 which is similar to contact 140 of switch 135. Fixed contacts 237 are arranged circumferentially on plate 238 in the same manner as contacts 137 on switch plate 138. Shaft 236 which carries arm 252 and contact 240 is grounded. Lamps 20 of panel board assembly 10 are connected to the respective contacts 237 and to one terminal of power supply 225.

Relay 206 has two movable contacts C7, C8 and two fixed contacts C9, C10. Contact C7 is connected to contact 270 of switch 210. Contact 272 of this switch is connected to power supply 208. Contact C8 is connected to timer motor 244. Contact C9 is connected to the coil of relay 206. Contact C10 is connected to power supply 225. The timer motor is operatively connected to shaft 236 to drive this shaft counterclockwise. Knob 33 is mounted on shaft 236 for turning this shaft manually.

When radio frequency signal R.F. 2 is received from the controlled station 100, it is applied via amplifier 202 and rectifier 204 to relay 206. This is only a short signal pulse but is sufficient to energize the relay so that contacts C7, C9 close and keep the relay energized via a holding circuit including battery 208. When contacts C8, C10 close they start timer motor 244 rotate contact 240 clockwise.

It will be recalled from the description of panel assembly 10 in FIG. 1 that the operator at the control tower initially turns knob 33 to set dial pointer 38 at the desired time interval marked on scale 40. This also turned shaft 236 and contact 239. The lamps 20 included in the selected timing interval light when the operator turns knob 33. Switch 210 closes at the same time. However the timer motor 244 does not start because contacts C8, C10 remain open waiting the arrival of an answer-back signal R.F. 2 from the controlled station 100 in reponse to receipt of the control signal R.F. 1 transmitted by the control apparatus 50. When this answer-back signal is received it pulses the relay 206 to energize it and the timer motor 244 starts to rotate contact 240 counterclockwise for extinguishing lamps 20, one by one. Thus both lamps 20 and 20' at the controlling and controlled timing devices go out in synchronism.

If the control station 200 does not receive immediate response from the controlled station 100 evidenced by the lighting of signal lamp 11 connected across the coil of relay 206, the operator will call the pilot or operator of the aircraft involved to inquire as to the delay. It is possible that the answer-back signal R.F. 2 was transmitted properly by the controlled station 100 but was not received at the controlling station 200. The operator at the control station 200 may then instruct the pilot at the aircraft to reset the timing interval manually to another shorter time. The pilot will do this by turning knob 33' to the new timing interval and by pushing the appropriate button 37' connected to relay 114'. This will have the effect of pulsing relay 114 and starting the timing cycle at the aircraft. At the same time, the operator at the control tower will push start button, turn knob 33 to set the new timing cycle. He will then push the start push button switch 19 to pulse relay 206. Switch 19 is connected between battery 208 and the coil of relay 206. The two timing devices will thus be started independently of each other.

It is possible that the controlled station 100 may not receive the transmitted controlling signal R.F. 1 from apparatus 50 to start timing at the controlled station. At the controlling station lamp 11 will not light and the lamps 20 will not go out in sequence. Upon receiving oral instruction by radio, the operator at the controlled station can start the timing manually, and the operator at the controlling station will do the same. If all the equipment is operating properly, when the operator at the controlled station 100 starts the timing manually, this will be sufficient to pulse relay 114 and send an answer-back signal R.F. 2 to the controlling station for starting the timer motor at the controlling station automatically.

There has thus been included provision in both controlling and controlled stations means for both automatic and independent manual operation. The apparatus 50 and 200 together constitute the controlling station.

The apparatus for setting and monitoring the expiration of the set time interval will be the same at both controlling and controlled stations for both of the other flight operations designated TAXI and DEPART on panel 12, as has been described for the ARRIVAL timing. The apparatus for each timing operation will include a timing switch 135 at the controlling station and a timing switch 235 at the controlled station. An additional group of audio frequencies A.F. will be used as controlling signals for each timed flight operation. The same transmitter apparatus 50 will be used for all timed operations.

While the panel assembly 10 is set up for timing three flight operations, more or less than three flight operations can be provided for increasing or decreasing the number of windows, sets of lamps, timing switches and associated components. While the external appearance of the panel assembly at a controlled station will be substantially the same as that of the panel assembly 10 at the controlling station, the associated equipment differs substantially as is evident by comparison of apparatus 100 with that of apparatus 50 and 200 taken together. The panel assembly installed in the aircraft can be made smaller and the associated apparatus can be made more compact, to minimize weight and size. The START buttons 19 and the monitoring signal lamps 11 will not be required in the panel assembly of the controlled apparatus in the aircraft, since push button switches 37' at the controlled station 100 serve for manual starting of the apparatus. In apparatus 50, by contrast the push button switches 37 operate to send the starting signals R.F. 1 and starting of timing is performed upon receipt of the answer-back signals R.F. 2, or upon manual operation of a START switch 19, after the operator sets the dial 30, 31 or 32 to the desired time interval indication on a scale 40.

FIGS. 8 and 9 show simplified timing apparatus which may be used when direct wire connections are available between a control station and a controlled or slave station.

For example, the master timing device 10a may be located at the official starter's position at a race track. The slave timing device 10a may be located at the starting position of the contestants in the race.

Device 10a has a window 300 in frame 302. Behind the window are compartments in which are lamps 20a designated by numbers 26a. The uppermost compartment may have a green window 301 or green lamp 20b while the other lamps 20a are colored red, or the remainder of the window 300 may be colored red. Below window 300 is a dial 30a having a knob 33a which is turned to set the dial pointer 38a at a desired time interval marked on scale 40a. The timing device 10b is connected to timing device 10a by a cable 304 containing connecting wires.

Timing device 10b has a lower red window 300' with an upper green window section 301'. Behind the window 301' is a lamp 20b' in the uppermost compartment to emit green light and the red light emitting lamps 20a' are in the lower compartments. The numbered lamps correspond in arrangement to those in timing device 10a.

As shown in FIG. 9 each lamp 20a is connected in series with an associated lamp 20a'. Lamp 20b is connected in series with lamp 20b'. The lamps are connected via wires 310 in cable 304. At the master timing device 10a is timing switch 135a having circumferentially arranged contacts 311 on plate 313. The contacts are connected to lamps 20a, 20a'. Lamps 20b, 20b' are connected to contact 312 of a pushbutton switch 314. Contacts 311 and 312 are normally open except when they are held closed by radial arm 315 of timing switch 316 at the position shown in FIG. 9 Normally closed contacts 318 and 319 of switch 314 are then held open by arm 315. Contact 318 is connected to timing motor 320. Contact 319 is connected to one terminal of the battery or power supply 325. One terminal of the motor is connected to battery or power supply 325. Contact 312 is connected to the grounded terminal of the battery 325. Switch arm 315 is grounded. Arcuate contact 330 is carried by arm 315 and closes the circuit for those lamps 20a, 20a' selected when shaft 336 is turned manually by turning knob 33a. Wire 340 connects the positive terminal of the battery to one terminal of each lamp circuit.

In operation of the apparatus including devices 10a, 10b at a race track, the operator may announce over a loudspeaker system, telephone connection or otherwise that a timing interval will be set to alert persons watching device 106. The operator then turns knob 33a to set the time interval. Switch 314 closes automatically and timer motor 320 starts automatically. The lamps 20a, 20a' go out in turn as the contact 330 sweeps counterclockwise over contacts 311. When arm 315 reaches switch 314, open contacts 311, 312 close to light lamps 20b, 20b' while closed contacts 318, 319 open to stop the motor 320. This leaves the contacts in the starting position shown in FIG. 9

When green lamps 20b, 20b' light, this signals the end of the timed interval, and the race may start. The apparatus can of course be installed in other locations where other timed intervals are to be set. These timed intervals may be a few or many seconds, minutes or hours. The timing motor will be selected to operate the timer switches at the required speed.

The invention described thus makes possible timing of preset intervals or periods by a controlling operator, and this same set period will be timed by a controlled device. Time remaining in the set period will be indicated by a progressively extinguished series of lights.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. Timing apparatus for setting a time interval and monitoring expiration of the set time interval, comprising a master timing device including a panel board assembly having at least one series of first lamps, timing switch means connected in circuit with said lamps for lighting simultaneously a predetermined number of said lamps corresponding to a selected time interval, timing motor drive means operatively connected to said switch means to extinguish one lighted lamp at a time during the set time interval, a slave timing device including another panel board assembly having at least one series of other lamps, and a circuit means interconnecting said other lamps and said timing switch means with one of the other lamps connected to each of the first lamps respectively, so that the same number of other lamps are lighted when said predetermined number of first lamps are lighted, and so that the lighted other lamps go out one by one simultaneously with the lighted first lamps until all the lighted lamps are extinguished at both timing devices at the end of the set time interval, two further lamps at the panel board asemblies respectively, said further lamps being connected together, and a switch in circuit with said further lamps disposed for operation by said timing switch means at the end of said set time interval, so that the further lamps light at the end of said time interval.

2. Timing apparatus for setting a time interval and monitoring expiration of the set time interval, comprising a master timing device including a panel board assembly having at least one series of first lamps, timing switch means connected in circuit with said lamps for lighting simultaneously a predetermined number of said lamps corresponding to a selected time interval, timing motor drive means operatively connected to said switch means to extinguish one lighted lamp at a time during the set time interval, manually operable means for setting said timing switch to light said predetermined number of lamps, control switch means in circuit with said drive means for starting the timing motor when said lamps are lighted, a slave timing device including another panel board assembly having at least one series of other lamps, other timing switch means connected in circuit with said other lamps for lighting simultaneously a plurality of other lamps equal in number to said predetermined number of first lamps, other timing motor drive means operatively connected to said other timing switch means, to extinguish one of the other lighted lamps at a time during said set time interval, manually operable switch means for setting the other timing switch means to light said plurality of other lamps, other control switch means in circuit with said other timing motor for starting the other timing motor after said other lamps are lighted, signal transmission means at said master timing device for transmitting a control signal corresponding to said predetermined number of first lighted lamps, means at the slave timing device for receiving said control signal, and automatic switch setting means responsive to receipt of said signal and operatively connected to said other timing means for setting the other timing switch means automatically to light said plurality of other lamps, whereby the timing motors at both timing devices start substantially simultaneously, whereby one of the first lighted lamps at a time and one of the other lighted lamps at a time go out simultaneously until all the lighted lamps at both timing devices are extinguished at the end of the set time interval.

3. Timing apparatus for setting a time interval and monitoring expiration of the set time interval, comprising a master timing device including a panel board assembly having at least one series of first lamps, timing switch means connected in circuit with said lamps for lighting simultaneously a predetermined number of said lamps corresponding to a selected time interval, timing motor drive means operatively connected to said switch means to extinguish one lighted lamp at a time during the set time interval, manually operable means for setting said timing switch to light said predetermined number of lamps, control switch means in circuit with said drive means for starting the timing motor when said lamps are lighted, a slave timing device including another panel board assembly having at least one series of other lamps, other timing switch means connected in circuit with said other lamps for lighting simultaneously a plurality of other lamps equal in number to said predetermined number of first lamps, other timing motor drive means operatively connected to said other timing switch means to extinguish one of the other lighted lamps at a time during said set time interval, manually operable switch means for setting the other timing switch means to light said plurality of other lamps, other control switch means in circuit with said other timing motor for starting the other timing motor after said other lamps are lighted, signal transmission means at said master timing device for transmitting a control signal corresponding to said predetermined number of first lighted lamps, means at the slave timing device for receiving said control signal, and automatic switch setting means responsive to receipt of said signal and operatively connected to said other timing swich means for setting the other timing switch automatically to light said plurality of other lamps, whereby the timing motors at both timing devices start substantially simultaneously, whereby one of the first lighted lamps at a time and one of the other lighted lamps at a time go out simultaneously until all the lighted lamps at both timing devices are extinguished at the end of the set time interval, other signal transmission means at the slave timing device for transmitting an answer-back signal when the other lamps are lighted, other signal receiving means at the master timing device for receiving said answer-back signal, and circuit means interconnecting said other signal receiving means and said further switch means at the master timing device for starting the timing motor thereat simultaneously with starting of said other timing motor at the slave timing device.

4. Timing apparatus for setting a time interval and monitoring expiration of the set time interval, comprising a master timing device including a panel board assembly having at least one series of first lamps, timing switch means connected in circuit with said lamps for lighting simultaneously a predetermined number of said lamps corresponding to a selected time interval, timing motor drive means operatively connected to said switch means to extinguish one lighted lamp at a time during the set time interval, manually operable means for setting said timing switch to light said predetermined number of lamps, control switch means in circuit with said drive means for starting the timing motor when said lamps are lighted, a slave timing device including another panel board assembly having at least one series of other lamps, other timing switch means connected in circuit with said other lamps for lighting simultaneously a plurality of other lamps equal in number to said predetermined number of first lamps, other timing motor drive means operatively connected to said other timing switch means, to extinguish one of the other lighted lamps at a time during said set time interval, other control switch means in circuit with said other timing motor for starting the other timing motor after said other lamps are lighted, signal transmission means at said master timing device for transmitting a control signal corresponding to said predetermined number of first lighted lamps, receiving means at the slave timing device for receiving said control signal, and automatic switch setting means responsive to receipt of said signal and operatively connected to said other timing switch for setting the other timing switch automatically to light, said plurality of other lamps, whereby the timing motors at both timing devices start substantially simultaneously, whereby one of the first lighted lamps at a time and one of the other lighted lamps at a time go out simultaneously until all the lighted lamps at both timing devices are extinguished at the end of the set time interval.

5. Timing apparatus for setting a time interval and monitoring expiration of the set time interval, comprising a master timing device including a panel board assembly having at least one series of first lamps, timing switch means connected in circuit with said lamps for lighting simultaneously a predetermined number of said lamps corresponding to a selected time interval, timing motor drive means operatively connected to said switch means to extinguish one lighted lamp at a time during the set time interval, manually operable means for setting said timing switch to light said predetermined number of lamps, control switch means in circuit with said drive means for starting the timing motor when said lamps are lighted, a slave timing device including another panel board assembly having at least one series of other lamps, other timing switch means connected in circuit with said other lamps for lighting simultaneously a plurality of other lamps equal in number to said predetermined number of first lamps, other timing motor drive means operatively connected to said other timing switch means, to extinguish one of the other lighted lamps at a time during said set time interval, other control switch means in circuit with said other timing motor for starting the other timing motor after said other lamps are lighted, signal transmission means at said master timing device for transmitting a control signal corresponding to said predetermined number of first lighted lamps, receiving means at the slave timing device for receiving said control signal, and automatic switch setting means responsive to receipt of said signal and operatively connected to said other timing switch means for setting the other timing switch means automatically to light said plurality of other lamps, whereby the timing motors at both timing devices start substantially simultaneously, whereby one of the first lighted lamps at a time and one of the other lighted lamps at a time go out simultaneously until all the lighted lamps at both timing devices are extinguished at the end of the set time interval.

6. A timing apparatus for setting a time interval and monitoring expiration of the set time interval as defined in claim 3, said automatic switch setting means including a rotatable gear, a longitudinally slidable rack gear meshed with the rotatable gear, solenoid operated latch means for holding the rack gear retracted, solenoid operated stop means for limiting travel of the rack gear when the latch means is released, and relay means connected in circuit with said receiving means, said solenoid operated latch means and solenoid operated stop means for setting said other timing switch when said control signal is received.

7. A timing apparatus for setting a time interval and monitoring expiration of the set time interval as defined in claim 6, wherein said other control switch means is disposed adjacent said rack gear for automatic actuation when said rack gear is released by the latch means, so that the timing motor starts after the rack gear is released and the other timing switch is set to light said plurality of other lamps.

8. A timing apparatus according to claim 7, wherein said other transmission means is connected in circuit with said relay means to transmit the answer-back signal when said control signal is received by said receiving means at the slave timing device.

9. A timing apparatus according to claim 4, said automatic switch setting means including a rotatable gear, a longitudinally slidable rack gear meshed with the rotatable gear, solenoid operated latch, means for holding the rack gear retracted, and solenoid operated stop means for limiting travel of the rack gear when the latch means is released, said other control switch means being disposed adjacent said rack gear for automatic actuation when said rack gear is released by the latch means, so that the timing motor starts after the rack gear is released and the other timing switch is set to light said plurality of other lamps.

10. A timing apparatus according to claim 5, said automatic switch setting means including a rotatable gear, a longitudinally slidable rack gear meshed with the rotatable gear, solenoid operated latch, means for holding the rack gear retracted, and solenoid operated stop means for limiting travel of the rack gear when the latch means is released, said other control switch means being disposed adjacent said rack gear for automatic actuation when said rack gear is released by the latch means, so that the timing motor starts after the rack gear is released and the other timing switch is set to light said plurality of other lamps.

References Cited by the Examiner
UNITED STATES PATENTS

| | | | |
|---|---|---|---|
| 1,124,215 | 1/1915 | Dempsey | 340—338 |
| 1,894,611 | 1/1933 | Lippistadt | 340—309.1 |
| 2,076,453 | 4/1937 | Fleer | 340—332 X |
| 2,526,495 | 10/1950 | Meyer. | |
| 2,733,923 | 2/1956 | Sterner | 340—325 X |
| 2,932,779 | 4/1960 | Tancig | 340—309.4 X |
| 3,181,134 | 4/1965 | LeSaint | 340—332 X |

NEIL C. READ, *Primary Examiner.*

R. M. GOLDMAN, *Assistant Examiner.*